UNITED STATES PATENT OFFICE.

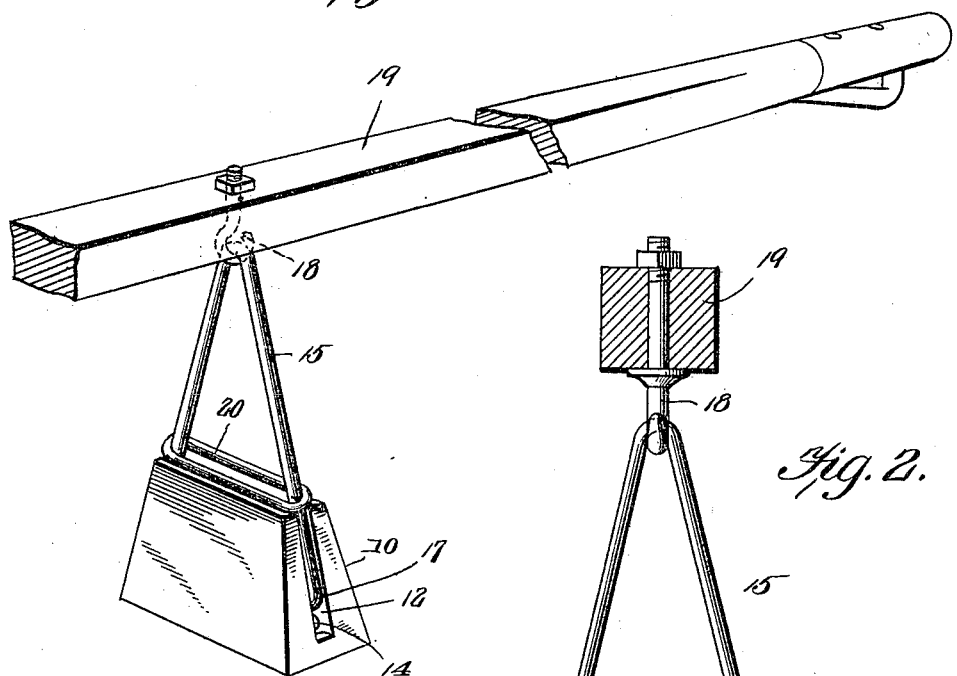
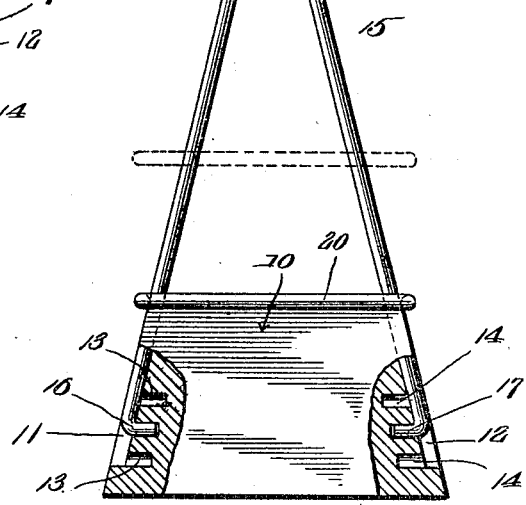

JOHN F. CELL, OF CHAMBERSBURG, PENNSYLVANIA.

TONGUE-SUPPORT.

No. 808,071. Specification of Letters Patent. Patented Dec. 26, 1905.

Application filed March 24, 1905. Serial No. 251,826.

*To all whom it may concern:*

Be it known that I, JOHN F. CELL, a citizen of the United States, residing at Chambersburg, in the county of Franklin and State of Pennsylvania, have invented a new and useful Tongue-Support, of which the following is a specification.

This invention relates to devices for supporting draft-tongues of various kinds, such as those employed upon harvesters, mowers, reapers, threshers, land-rollers, seed-drills, and similar machines where the weight of the free end of the tongue rests upon the necks of the horses and maintains the tongues substantially in the same position when the horses are detached as when they are coupled thereto.

The object of the invention is to simplify and improve the construction and increase the efficiency of devices of this character.

With this and other objects in view, which will appear as the nature of the invention is better understood, the same consists in certain novel features of construction as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a perspective view of the improved device applied. Fig. 2 is a transverse section, enlarged, of the same.

The improved device comprises a base-block 10, which may be of wood or metal, as preferred, and provided with channels 11 12 in the ends and with spaced sockets 13 14 in the bottoms of the channels. Extending from the block 10 is a substantially U-shaped member 15 for bearing by its legs in said channels and with inwardly-turned terminals 16 17 for entering said sockets. The member 15 will be of metal, preferably of steel, and possessing a certain degree of resiliency, so that it will retain its position in the sockets when placed therein, while at the same time yieldable to pressure exerted outwardly to move the ends 16 17 from one socket to another in adjusting the device. The U-shaped member with its base-block attached is designed to be suspended, as by a hook or eyebolt 18, from a draft-tongue 19, preferably near the rear or inner end, for bearing on the ground when the horses are detached, to prevent the draft-tongue dropping to the ground. The member 15 will be adjusted to cause the block 10 to be held just free of the ground when the horses are hitched to the tongue, so that the presence of the block does not interfere with the action of the machine to which it is attached, while at the same time holding the free end of the tongue sufficiently elevated when the horses are unhitched to materially lessen the labor and materially assist in the operation of "hitching up." The operator is thus not required to hold the tongue while attaching the neck-yoke, but both hands are free to couple the various parts of the harness. A lock-link 20 may be applied to the member 15, as shown, to increase the efficiency and effectually prevent any liability of accidental displacement.

The device is simple in construction, can be readily applied to any draft-tongue, and will operate effectually for the purpose described, and will not materially increase the expense of the machine to which it is applied.

Having thus described the invention, what is claimed is—

1. A draft-tongue support comprising a base member having channels in its ends and spaced sockets in said channels, and a substantially U-shaped member having its arms fitted within said channels and provided with inwardly-turned ends for adjustably engaging said sockets, and means for suspending said U-shaped member from a draft-tongue.

2. A draft-tongue support comprising a base-block, a substantially U-shaped member connected by its ends adjustably to said block, means for suspending said U-shaped member beneath the draft-tongue, and a lock-link slidably engaging the U-shaped member and bearing upon the base-block.

3. A draft-tongue support having a block, a U-shaped member having downwardly-deflected arms removably engaging the block, means for connecting said member to a draft-tongue, and a gravity-link engaging the arms of the U-shaped member above the block.

In testimony that I claim the foregoing as my own I have hereto affixed my signature in the presence of two witnesses.

JOHN F. CELL.

Witnesses:
SARAH T. FROMMEYER,
ARTHUR W. GILLAN.